3,278,390
SUBSTANCE FOR REMOVING BLOOD
Edwin P. Arthur, Fullerton, Calif., assignor to Beckman Instruments, Inc., a corporation of California
No Drawing. Filed Feb. 14, 1964, Ser. No. 344,829
4 Claims. (Cl. 195—2)

This invention relates to a substance for removing blood from a surface and, more particularly, to a substance for removing blood from delicate glassware or the like used in chemical laboratories.

A serious problem in clinical laboratories is the cleaning of the delicate glassware commonly used in making clinical analyses. Once blood has dried on such glassware it is extremely difficult to remove and, because the glassware is often very delicate, brushing or scraping techniques which might be suitable for removing blood from certain other surfaces is not permissible.

Protein digestant enzymes have been used in the past for removing the protein and fat portions of meat from meat processing machinery and also for removing blood from some glassware. However, the enzymes have not been wholly successful in completely removing blood from the surfaces and, most specifically, in removing dried blood from glassware, such as glass electrodes with glass bulbs only one-tenth of a millimeter in thickness.

It is, therefore, the principal object of the present invention to provide a substance for completely removing blood and associated residue from any surface, particularly delicate glassware.

A further object of the invention is to provide a substance for removing blood from glassware without requiring rubbing, brushing, or scraping.

According to the principal aspect of the present invention, it has been found that by providing a mixture of a nutrient, a substance capable of metabolizing the nutrient and a protein digestant enzyme, and by suspending the mixture in a lukewarm body of purified water and applying it to a surface coated with blood, that the blood is removed from the surface with remarkable efficiency.

More specifically, I have found that by mixing approximately equal parts by volume of a nutrient such as crushed seeds of a cereal grass, a substance capable of metabolizing the nutrient substance such as a viable yeast, fungi, mold, mildew, alga or baceterium along with a protein digestant enzyme, there is provided a greatly improved means for removing blood from any surface and, most particularly, from glassware. Although it is suggested that equal parts by volume be provided of the constituents comprising the mixture, it is to be understood that the proportions of the constituents are not critical, it only being required that sufficient amount of each constituent be provided to permit the enzyme to dissolve the protein and fat portions of the blood and residue associated therewith and to permit the biochemical activity of the nutrient and its metabolizing agent to take place.

Preferably, the mixture is suspended in 4 or 5 parts by volume of lukewarm distilled water as a slurry and the slurry is then applied to the suface bearing blood and blood residue for several hours, preferably six to eight hours. While it is known that the protein digestant enzyme hydrolyzes proteins thus rendering them soluble to an extent, the cleaning action is vastly improved by the nutrient and the metabolizing agent for the nutrient which vigorously increase the total biochemical activity of the mixture with the blood. The nutrient and metabolizing agent react in the warm water with the blood to produce carbon dioxide which furnishes a gentle but intense microaction at surface interfaces to aid cleaning without resorting to mechanical devices, scrapers or the like. After sufficient time has elapsed that the rate of the biochemical metabolism has been reduced, the blood and the products of the biochemical activity on the surface may be removed therefrom by merely rinsing the surface with warm water. This method has been found to be extremely simple, inexpensive and permits complete removal of blood from the surface of glassware or the like.

For storage or packaging, the equilibrium ambient air-dry nutrient, metabolizing agent and protein digestant enzyme are mixed at a net moisture level sufficiently low to leave the mixture biochemically stable. However, it is important that neither the mixture nor components be heated to any temperature approaching 140° F. lest the biochemical functional capacity of the mixture be impaired. Once the mixture has been dried by heating at low temperature in a low vacuum oven or the like, it may then be packed in an airtight envelope preferably in an atmosphere of carbon dioxide for storage. Thereafter, when it is desired to utilize the substance of the invention for cleaning blood from a surface, the envelope may be opened and the mixture therein suspended in a body of lukewarm distilled water and then applied to the surface to be cleaned. I prefer to avoid tap water which may contain chlorine, fluorides, or other biochemical inhibitors.

One example of a mixture which has been made for cleaning blood from glassware included approximately equal parts by volume of air-dry wheat middlings as the nutrient, dry viable bakers' yeast as the metabolizing agent and Rhozyme (an enzyme product of Rohm & Haas Company) as the protein digestant enzyme. These constituents were thoroughly mixed and then dried in a low vacuum oven to render the mixture biochemically stable. Thereafter, the mixture was packed in an airtight envelope containing substantially only carbon dioxide in vapor phase.

Later the envelope was opened, the mixture removed and poured into a beaker containing a limited amount of lukewarm distilled water, sufficient to make a thin slurry. Thereafter, glassware having dried blood thereon was placed in the beaker containing the slurry. After leaving the glassware in the slurry overnight, it was found that by merely rinsing the glassware with warm water all the dried blood, blood residue, albumin and the like were completely removed. It can be readily seen that the present invention has great utility in clinical laboratories using glassware which by necessity becomes contaminated with blood. However, the invention has the same extent of utility for cleaning blood from surfaces other than glass. For example, it is believed that the invention would be very useful for cleaning meat and food processing machinery.

Although several embodiments of the invention have been disclosed herein for purposes of illustration, it will be understood that other applications of the invention are possible and that the embodiments disclosed may be subject to various changes, modifications and substitutions without necessarily departing from the spirit and scope of the invention as defined by the appended claims.

What is claimed is:

1. A method of removing blood from a surface comprising:
    providing a biochemically stable mixture of a nutrient, a substance capable of metabolizing said nutrient and a protein digestant enzyme;
    adding said mixture to water to provide a slurry in which the nutrient and metabolizing substance react to produce carbon dioxide;
    applying said slurry to a surface of machinery or glassware coated with blood whereby said carbon dioxide furnishes a gentle but intense microaction at the surface interfaces of the blood to be removed thereby enhancing the cleaning action of the enzyme; and
    thereafter, rinsing the resulting products of biochemical activity and the blood residue from said surface.

2. A method as set forth in claim 1 wherein said nutrient, metabolizing substance and protein digestant enzyme are provided in substantially equal parts by volume.

3. A method as set forth in claim 1 wherein said metabolizing substance is selected from the group consisting of viable yeast, fungi, mold, mildew, alga and bacterium.

4. A method as set forth in claim 1 wherein said nutrient is selected from the group consisting of crushed seeds of cereal grass and wheat middlings.

References Cited by the Examiner

UNITED STATES PATENTS

| | | | |
|---|---|---|---|
| 1,421,613 | 7/1922 | Takamine et al. | 195—4 |
| 2,528,403 | 10/1950 | West | 210—11 |
| 2,536,171 | 1/1951 | Hall et al. | 195—29 |

OTHER REFERENCES

Food Industries, vol. 22, August 1950, pp. 87–88.

Laundry Age, Jan. 1, 1944, pp. 51, 52, 54 and 56 (page 51 relied on).

Science, vol. 98, p. 160, Aug. 16, 1943.

A. LOUIS MONACELL, *Primary Examiner.*

L. M. SHAPIRO, *Assistant Examiner.*